(12) United States Patent
Schmidt et al.

(10) Patent No.: US 8,381,937 B2
(45) Date of Patent: Feb. 26, 2013

(54) DOUBLE-WALLED TANK CONTAINER

(75) Inventors: Thomas Schmidt, Niederdreisbach (DE); Dieter Pfau, Elkenroth (DE); Till Gerhard, München (DE)

(73) Assignee: WEW Westerwalder Eisenwerk GmbH, Weitefeld (DE)

( * ) Notice: Subject to any disclaimer, the term of this patent is extended or adjusted under 35 U.S.C. 154(b) by 1863 days.

(21) Appl. No.: 11/254,204

(22) Filed: Oct. 18, 2005

(65) Prior Publication Data

US 2006/0096991 A1     May 11, 2006

Related U.S. Application Data

(63) Continuation-in-part of application No. 10/334,957, filed on Dec. 31, 2002, now abandoned.

(30) Foreign Application Priority Data

Oct. 11, 2002 (DE) .............................. 202 15 657 U

(51) Int. Cl.
    *B65D 90/02*     (2006.01)

(52) U.S. Cl. ..................... 220/560.03; 220/1.5; 220/920; 220/647

(58) Field of Classification Search ................. 220/920, 220/1.5, 560.03, 62.18, 647, 646, 918, 919
See application file for complete search history.

(56) References Cited

U.S. PATENT DOCUMENTS

| | | | | |
|---|---|---|---|---|
| 2,060,942 A | * | 11/1936 | Kline et al. | 220/592.19 |
| 2,148,278 A | * | 2/1939 | Rose | 220/592.19 |
| 2,189,945 A | | 2/1940 | Fitch | |
| 3,143,108 A | | 8/1964 | Rogers | |
| 3,352,028 A | * | 11/1967 | Richman | 73/865.6 |
| 4,882,912 A | * | 11/1989 | Fossey | 62/297 |
| 4,895,272 A | * | 1/1990 | De Benedittis et al. | 220/745 |
| 4,936,705 A | | 6/1990 | Schneider | |
| 5,071,166 A | * | 12/1991 | Marino | 280/830 |
| 5,244,110 A | * | 9/1993 | Gerhard | 220/562 |
| 5,346,093 A | * | 9/1994 | De Benedittis et al. | 220/565 |
| 5,390,806 A | * | 2/1995 | Elston et al. | 220/1.5 |
| 5,589,631 A | * | 12/1996 | Spring et al. | 73/49.2 |

FOREIGN PATENT DOCUMENTS

| | | |
|---|---|---|
| DE | 1 820 098 | 10/1960 |
| DE | 1 857 238 | 8/1962 |
| DE | 1 179 959 | 10/1964 |
| DE | 1 947 978 | 10/1966 |
| DE | 1 286 459 | 1/1969 |
| DE | 25 41 375 | 3/1977 |
| DE | 32 12 696 C2 | 10/1983 |
| DE | 696 03 808 T2 | 1/2000 |
| FR | 2 291 923 | 11/1974 |
| FR | 2 288 681 | 5/1976 |
| GB | 2 013 624 A | 8/1979 |

* cited by examiner

*Primary Examiner* — Stephen Castellano
(74) *Attorney, Agent, or Firm* — Frost Brown Todd LLC

(57) ABSTRACT

The present invention concerns a double-walled tank container, whereby the inner container is stored at the bottom inside the outer enclosure by a spacer consisting of several spacer pieces. The spacer provided, which is preferably placed near a front saddle ring, imparts transportation and storage stresses between the inner tank and the outer enclosure and consequently between the inner container and the frame of the tank container. The spacer can be laid out in such a way that it absorbs shocks and/or defines a hollow space. This hollow space can serve as a thermal insulation or for the installation of temperature equalization devices, mediums or a leak detector fluid.

10 Claims, 5 Drawing Sheets

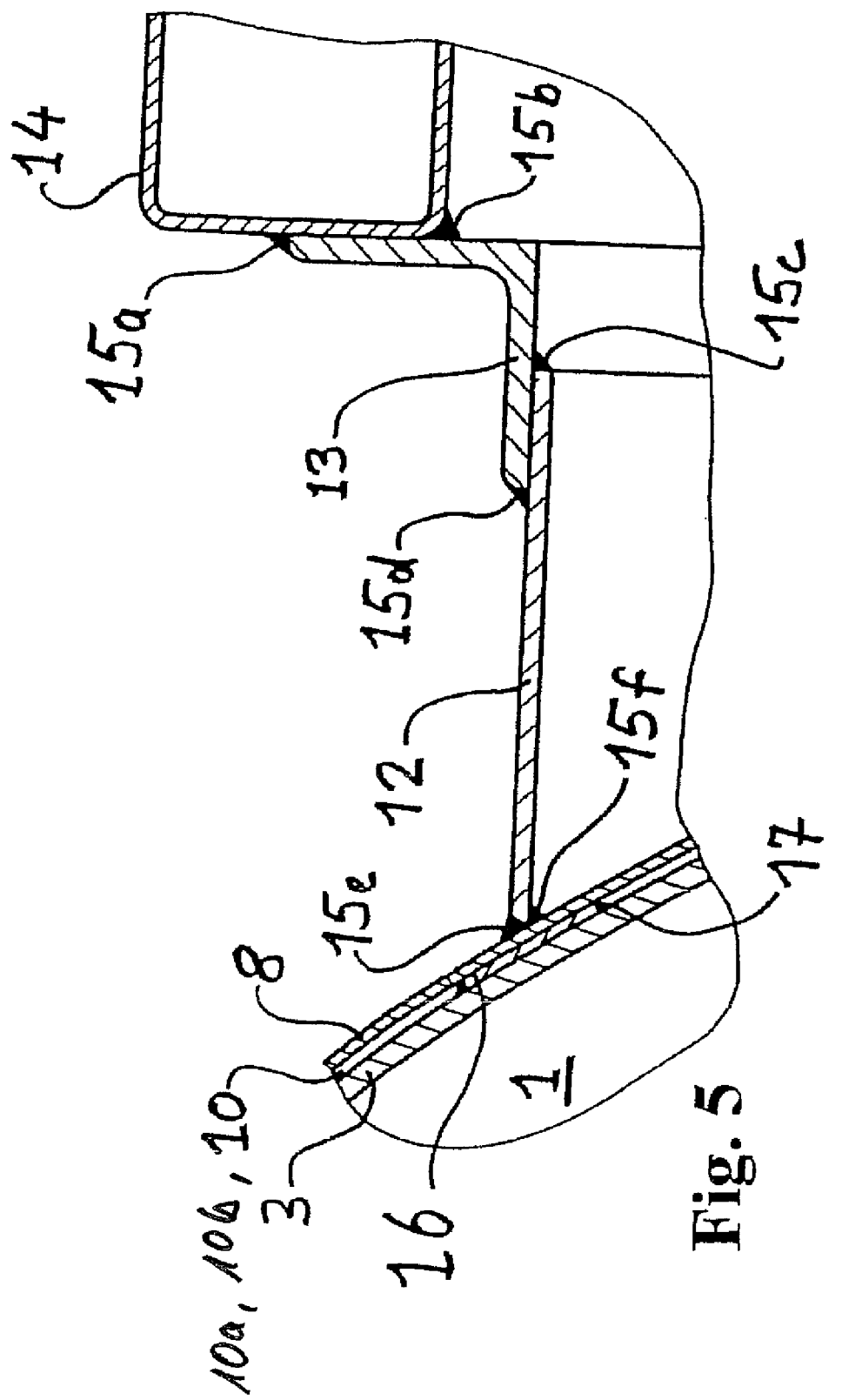
Fig. 5 (Section A-A)

DOUBLE-WALLED TANK CONTAINER

CROSS-REFERENCE TO RELATED APPLICATIONS

This is a continuation-in-part of prior U.S. patent application Ser. No. 10/334,957, filed on Dec. 31, 2002, now abandoned, which claims priority from German Patent Application No. DE 202 15 657.5, filed on Oct. 11, 2002, each of which is incorporated herein by reference in their entirety.

BACKGROUND OF THE INVENTION

Certain applications require the use of double-walled tank containers. In this case, an inner container is more or less completely enclosed by an outer container. These designs are necessary when the container needs to be extremely leak-proof, such as, for example, when the interior plate is brittle and the inner tank requires a high degree of protection against exterior impacts, or needs to be completely protected by a liquid temperature equalization medium. The leak-proof character often needs to be further increased by filling the space between the outer and inner tank with a non-hazardous test liquid thus revealing possible leaks in both the inner as the outer tank.

It is expedient that the outer containers of such tank containers can be incorporated in proven and standardized frame constructions customary for single-walled containers. Ring saddle mountings, such as described in DE 32 12 696 C2, have proven to be worthwhile in the field of tank containers. In this design, the tank is connected with the front frames via the vaulted dished ends of the tank. This construction enables the stress between the tank and the frame, which occurs during handling and transportation of the tank containers, to be completely imparted. Other connections between the tank and the frame are generally not necessary.

FIG. 7 shows a known design of a head ring saddle mounting on a double-walled container, whereby a front ring (12') runs through the exterior bottom plate (8', 8") and is welded to the interior bottom plate (3'). This requires separating the exterior dished end and running a piece (8') around the interior bottom plate (3') back to the front ring (12'), as well as mounting an exterior bottom piece (8") in the front ring (12"). This procedure is unsatisfactory from a production viewpoint and unsuitable for inner containers with a brittle interior bottom plate since the stresses from transportation and handling directly work on the tank plate covered with the coat. Increasing the wall thickness of the entire inner tank, or at least the dished ends of the inner container, can offset this. This would increase the weight of the tank considerably.

Furthermore, this design does not guarantee that the container will be leak-proof and increases the production cost. The head ring (12') needs to be interrupted in the area where it is connected with the interior dished end in order to enable the hollow space (10') inside the head ring to interconnect with the hollow space (10') outside the head ring, and to allow a leakage detector liquid to run through it. Furthermore, there is a risk that a leak (3"') in the area of the welding between the head ring (12') and the interior dished end is not shown because possible double sheet metal plating (12") in the head ring might cause the leak to seep out through the exterior bottom plate (8', 8") without activating the leakage detector.

SUMMARY OF THE INVENTION

The present invention aims at fastening an inner tank in the defined position in an outer enclosure, enabling stresses and strains to be imparted between the inner tank and the frame without having to interrupt the outer enclosure in the strain transmission areas. Furthermore, it aims at realizing low-cost production measures to leak-proof the container, and making light inner tanks with brittle interior coats available for tank containers.

According to a first aspect of the invention, the solution to this problem consists of a tank container as described in claim 1 whereby the inner tank is fixed lengthwise inside an outer tank connecting the latter to the front frame in a conventional way with a front ring saddle mounting. Since the vaulted interior and exterior dished ends have a process tolerance, it is impossible to install the inner container inside the outer container without compensating these process tolerances. The spacer arrangement mounted directly between the interior and the exterior dished ends, also solves this problem. The frusto-conical design not only absorbs the stresses running in the direction of the tank axis, but also radial and vertical stresses, and imparts them to the head ring which is mounted in the vicinity of the spacer arrangement according to claim 2.

Claim 3 covers a design in which the inner tank does not have to be completely encompassed by the outer tank. This is the case when the outer tank serves as a leakage safety device and therefore only needs to reach the maximum filling height of the inner tank.

Claim 4 covers a tank container whereby the outer enclosure completely encompasses the inner enclosure and the connections attached to the inner enclosure can penetrate the outer enclosure. The design described in claim 5 refers to a leak detector liquid or a heating or cooling medium in the hollow space allowing a thorough rinse of the clearance.

The design described in claim 6 allows for the installation of a heating or cooling device between the inner and outer enclosure. Appropriate spacers are required. The heating or cooling device either controls the temperature of the inner tank directly or the temperature of a medium between the inner and outer surface.

A second aspect of the invention concerns a tank container with a double-walled tank comprising:

A frame; an outer tank enclosure mounted to the frame and including an outer cylindrical section having two ends and dished ends closing of each end of the outer cylindrical section;

An inner tank enclosure, within the outer tank enclosure including an inner cylindrical section having two ends and interior dished ends closing of each end of the inner cylindrical section; and several spacer pieces, which are placed between each exterior dished end and the corresponding interior dished end in a frusto-conical ring arrangement concentric with respect to a longitudinal tank axis of the outer cylindrical section and following an exterior surface of the interior dished end and an interior surface of the exterior dished end.

According to a third aspect of the invention, a tank container with a double-walled tank comprises:

A frame; an outer tank enclosure mounted to the frame and including an outer cylindrical section having two ends and exterior dished ends closing of each end of the outer cylindrical section;

An inner tank enclosure within the outer tank enclosure including an inner cylindrical section having two ends and interior dished ends closing of each end of the inner cylindrical section; and Wherein a spacer arrangement is placed between each exterior dished end and the corresponding interior dished end in a frusto-conical ring arrangement concentric with respect to a longitudinal tank axis of the outer cylindrical section and following an exterior surface of the interior dished end and an interior surface of the exterior dished end, Wherein the spacer arrangement is made of first shock absorbing material and the hollow space between the inner tank enclosure and the outer tank enclosure is filled with a second material, wherein the first material includes PUR/PIR foams, elastomers and plastics and the second material includes PUR/PIR injection foams.

Such a design concerns mainly tank containers with a coated inner container. In this case, shock-absorbing spacers connect the inner tank with the outer tank. High-resistance PUR/PIR foams especially allow for a very smooth stress transition in the inner container. Filling the space between the inner and the outer tanks with foam enhances this effect, and allows for extremely thin-walled, light yet coated inner containers. For this, the outer container needs to be closed completely.

BRIEF DESCRIPTION OF THE DRAWINGS

The drawings below illustrate preferred embodiments of the Invention. In these drawings:

FIG. 3 shows a side view in a wire frame depiction of an interior dished end with respect to an exterior dished end with spacer elements in between;

FIG. 5 shows a detail of the front ring saddle mounting according to the invention in a section view (Section A-A in FIG. 2b);

DETAILED DESCRIPTION OF THE INVENTION

Figure 1:
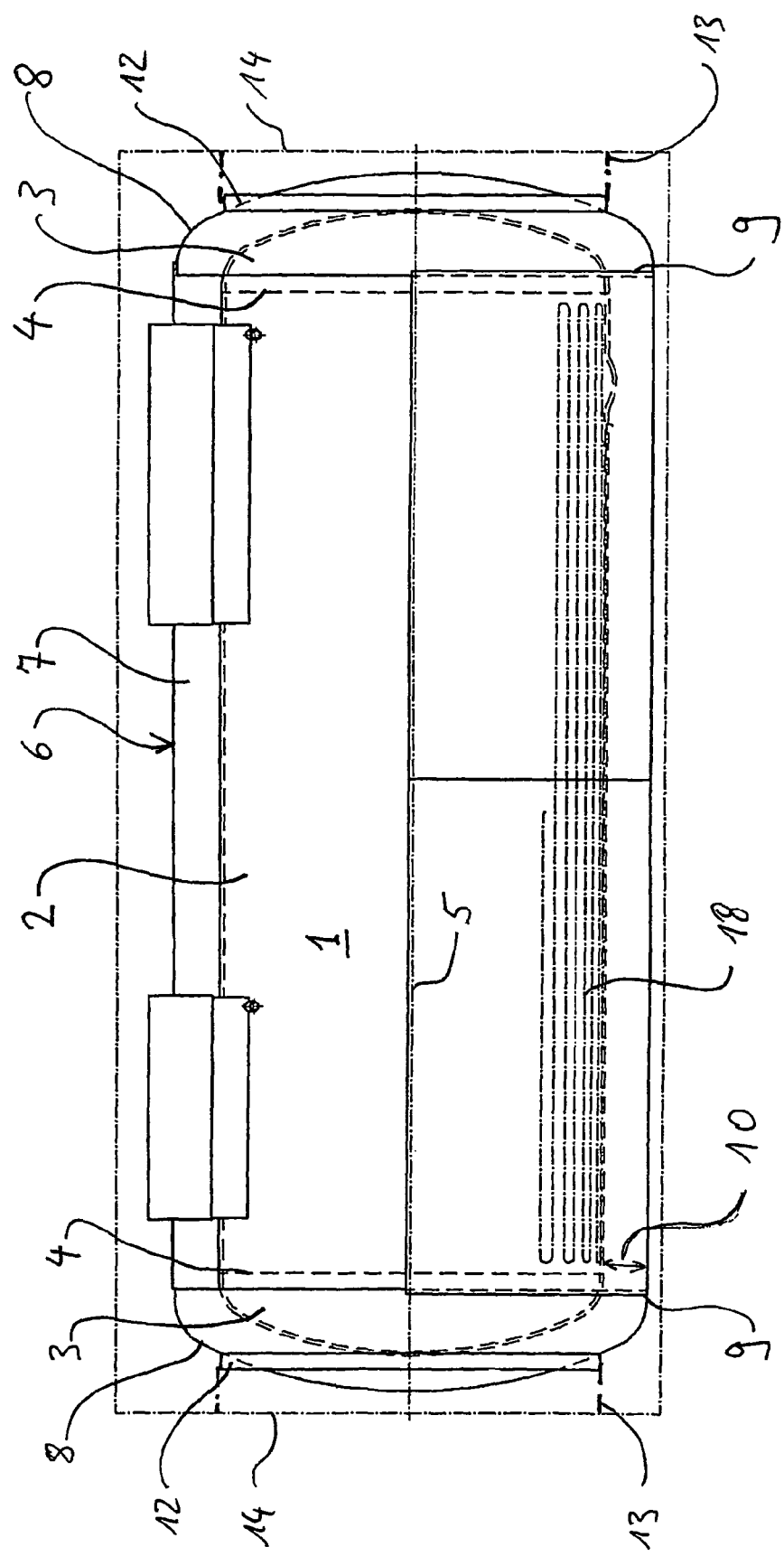
FIG. 1 shows a schematic side view of a tank container with a double-walled tank. The frame and the tank frame connection is indicated by dotted lines.

According to the invention shown in FIG. 1, the container has a double-walled tank 1 with an inner tank composed of an inner cylindrical center section 2 and interior dished ends 3 connected via weldings 4. Both the tank section 2 and the interior dished ends 3 are concentric with respect to the tank axis 5. Furthermore, the double-walled tank has an outer enclosure 6 comprising an outer cylindrical section 7 and exterior dished ends 8. The parts 7, 8 are also concentric with the tank axis 5 and are connecting via the welding 9.

Figure 2B:
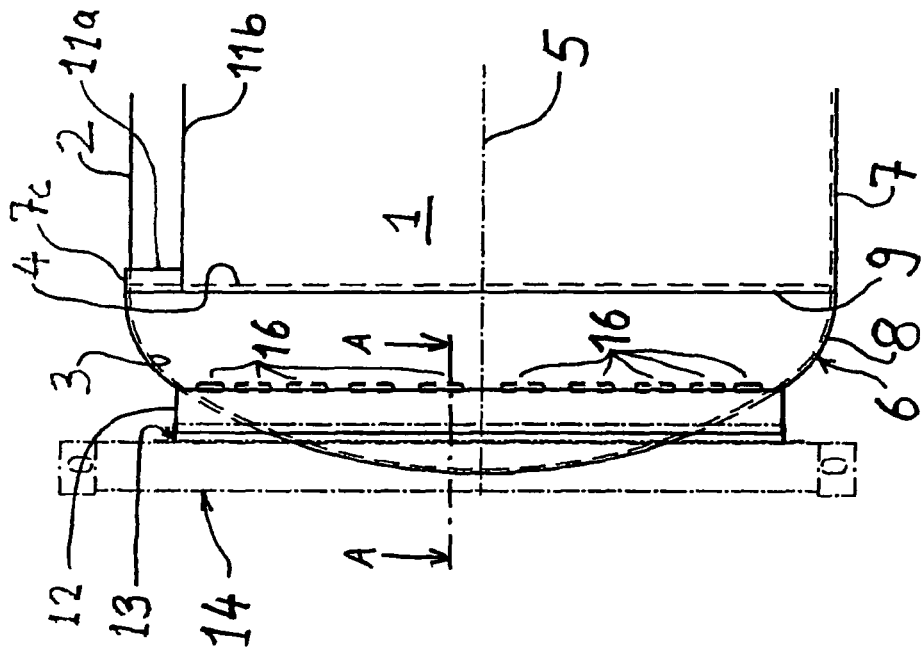
FIG. 2b shows a partial side view of a tank container according to the second aspect of the invention with a schematic presentation of the front frame.

FIG. 2b shows an embodiment in which the cylindrical section 7 only partially encompasses the tank section, thus keeping the apex area uncovered. This design is expedient when the inner container 2, 3 only needs to be encompassed up to its maximum filling height instead of being encompassed completely. A clearance 10 between the inner tank 2, 3 and the outer enclosure 7, 8 is welded shut by the weldings 11a and 11b.

A cylindrical head ring 12 and an L-Profile saddle ring 13 connect the exterior dished end 8 with a frame (not shown in FIG. 2a) equipped with a head frame 14. Welded joints 15a through 15f (FIG. 5) connect the head frame 14, saddle ring 13, head ring 12 and the exterior dished end 8.

Spacer pieces 16 create the clearance 10 between the exterior dished end 8 and the interior dished end 3. A conical arrangement of the spacer pieces 16 makes the spacers concentric with respect to the tank axis of the outer surface of the interior dished end 3 and the inner surface of the exterior dished end 8. The spacers are located in the area of the welded joints 15e and f, thus allowing the stress imparted over the front ring 12 to be imparted through the exterior dished end 8 over the spacer pieces 16 on the interior dished end 3. Thanks to the conical arrangement, the stress can be imparted in the direction of the tank axis, as well as in a radial direction of the tank axis. The embodiment in FIG. 5 shows spacer pieces 16 attached with spot welding to the interior dished end 3. It is also possible to attach the spacers to the inner surface of the exterior dished end 8.

The size of the spacer pieces 16 determines the size of the hollow space 10 and also offsets the process tolerance of the interior and exterior dished ends 3, 8 in such a way that the inner tank 2, 3 is clamped between the exterior dished ends.

Other variants on the proposed invention can consist of using spacer arrangement as a frusto-conical ring 20 (FIG. 6) or a concave disk (not shown) between the interior dished ends 3 and the exterior dished end 8 instead of individual spacer pieces 16, 16a. This is useful in long containers to impart stresses in a radial direction to the tank axle 5 between the inner tank 2, 3 and the outer enclosure 6.

Figure 6:
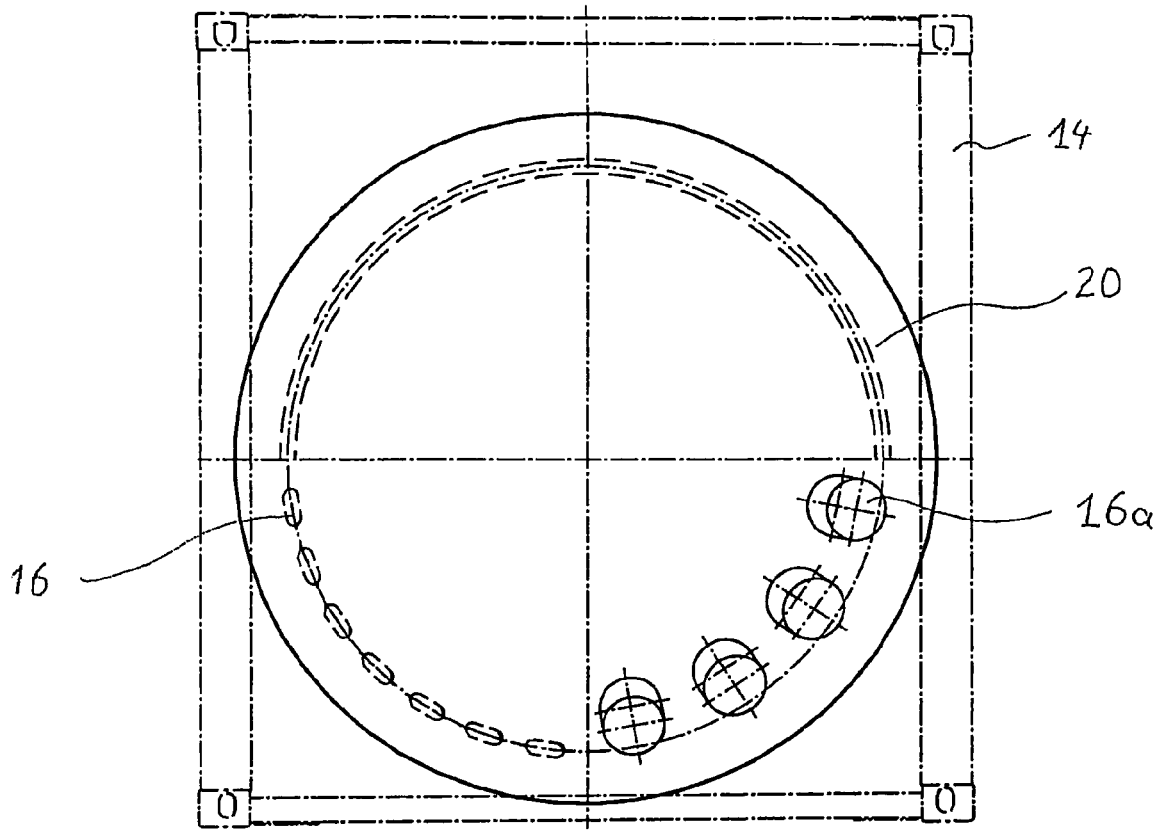
FIG. 6 shows a schematic split view of embodiments according to the first, the second and the third aspect of the invention.
Figure 7:
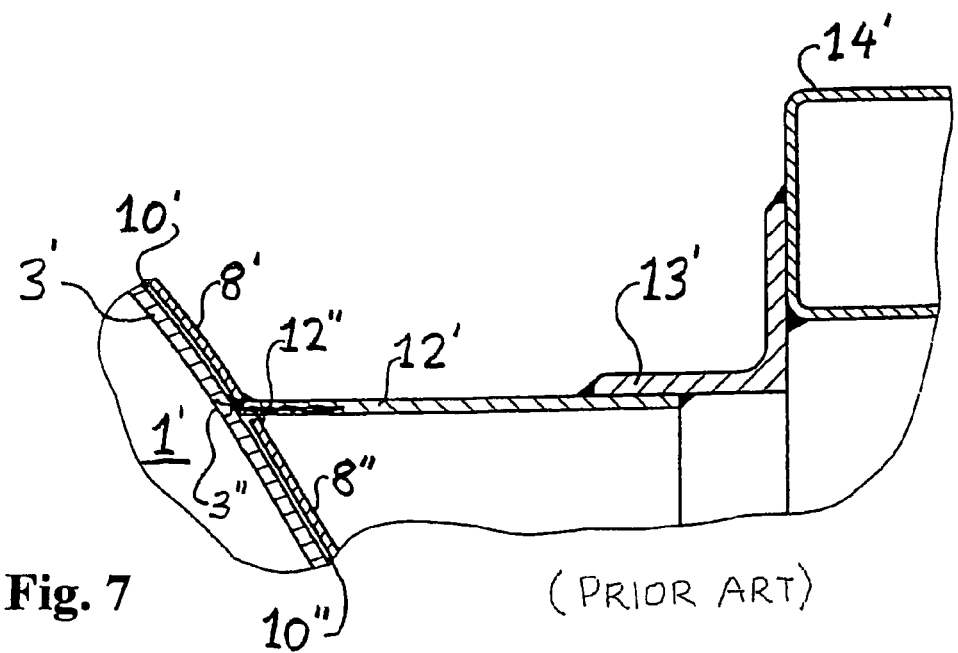
FIG. 7 shows a detailed view of a conventional front ring mounting of a double-walled container similar to the view of FIG. 5.

Referring to FIG. 6, the upper half of the illustration shows the frusto-conical ring 20 which is inserted between the interior dished end 3 and the exterior dished end 3. The lower left section shows an arrangement in which the spacer is formed by a plurality of disk-like spacer pieces 16 (see also FIG. 2b and FIG. 5) and the lower right arrangement shows an embodiment in which thick foam spacers 16a are inserted between the interior and the exterior dished end (see also FIGS. 2a, 3, 4).

When the tank container is in use, the hollow space 10 serves as a leakage control device. For this purpose, the hollow space 10 is completely filled with a harmless test liquid 10a and connected in an interconnecting way with a compensator reservoir (not shown) placed above the apex of the tank. The connection in the apex of the tank (not shown) is laid out in a shell type arrangement 7c. The filling level of the compensator reservoir can be checked through an inspection glass or an extra level indicator. In case of a leakage in the inner tank 2, 3, the test liquid enters the inner tank and the gauge in the control reservoir drops. Changes in the filling level are determined with regular checkups or by an audio and/or video signal.

The hollow space 10 can also be used for the circulation of a liquid or gaseous temperature equalization medium 10b. The temperature of this medium is controlled by a connected aggregate 18 (FIG. 1).

Figure 2A:
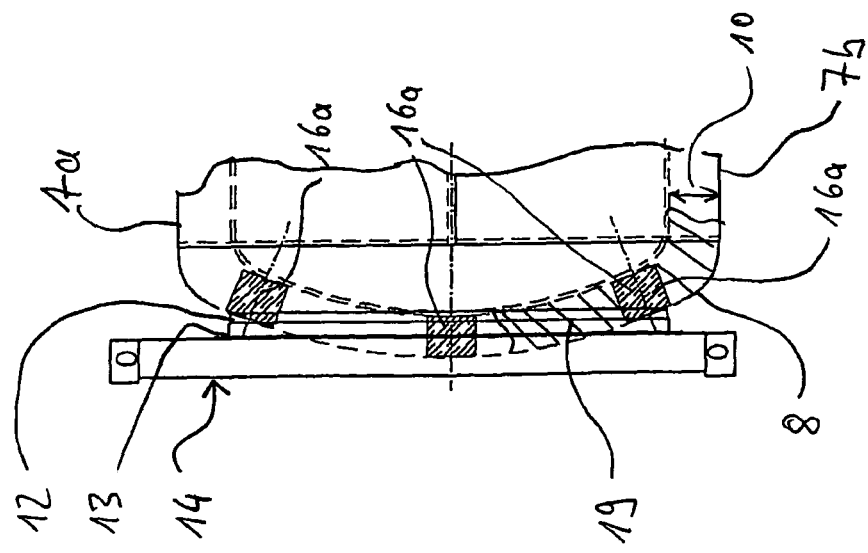
FIG. 2a shows a partial side view of a tank container according to the third aspect of the invention.
Figure 4:
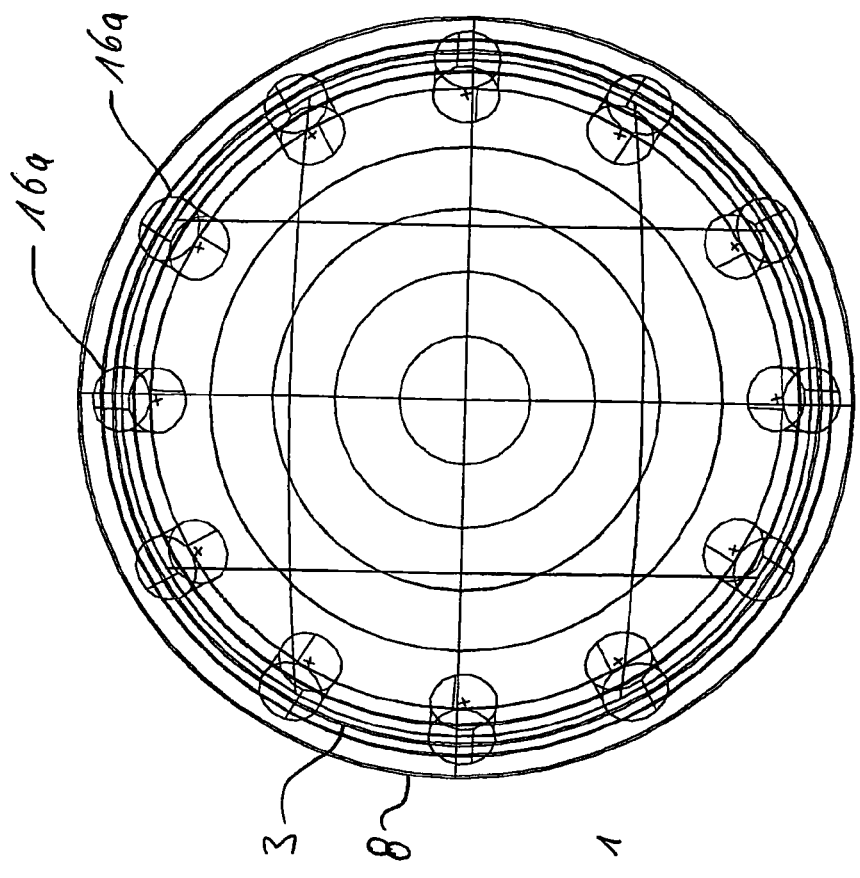
FIG. 4 shows a frontal view of the arrangement from FIG. 3.
Figure 3:
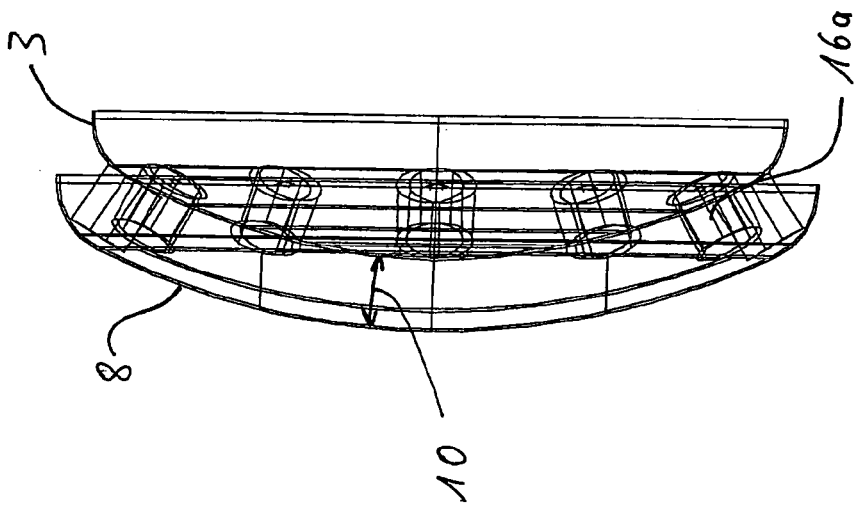

FIGS. 2a, 3 and 4 shows a design with very thick spacer pieces 16a creating a very large hollow space 10. These spacer pieces 16a consist of a shock-absorbing material (high resistance PUR/PIR, elastomers, plastics, etc.) creating an energy absorbing, buffering elastic force coupling between the inner tank 2, 3 and the outer enclosure. In the pictured design, the cylindrical section 7 of the outer enclosure 6 completely encompasses the inner tank 2, 3 and is composed of the reference cylinder shell segments 7a and 7b, welded together and to the exterior dished end 8 in an overlapping design. This layout is extremely suitable for inner tanks 2, 3 with a brittle interior coat (not shown) necessary for very aggressive cargos. The elastic floating arrangement of the inner tank 2, 3 in the outer enclosure 7a, 7b, 8 avoids strains causing rips in the coat. The hollow space 10 may be additionally filled with so-called high-resistance PUR/PIR 19 (FIG. 2a). This increases the protective capacity of the inner tank 2, 3. At the same time, this creates a considerable thermal insulation effect, which is very useful for the transportation or storage of temperature equalized freights.

A possible design for this type of freight consists of a temperature control unit 18 (FIG. 1) installed in the hollow space 10 between the inner tank 2, 3 and the outer enclosure 6. This temperature equalization unit could be made of half pipes, a resistance heating element or other temperature control devices welded to the inner tank.

The shock-absorbing spacer pieces 16a may also come as liquid-filled cases or flexible tubing for construction with a very large hollow space 10. With this type of spacer pieces 16a and filling of the hollow space 10, the inner container 2, 3 can be stored so safely that it can even be made of a brittle material such as glass.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. Tank container with a double-walled tank comprising:
    a frame;
    an outer tank enclosure mounted to the frame and including an outer section having two ends and exterior dished ends closing off each end of the outer section;
    an inner tank enclosure, within the outer tank enclosure including an inner cylindrical section having two ends and interior dished ends closing off each end of the inner cylindrical section, wherein the outer section of the outer tank enclosure only partially encompasses the inner cylindrical section of the inner tank enclosure; and
    a spacer arrangement which is placed between each exterior dished end and the corresponding interior dished end in a frusto-conical ring arrangement concentric with respect to a longitudinal tank axis of the outer section and following an exterior surface of the interior dished end and an interior surface of the exterior dished end.

2. The tank container of claim 1, wherein the spacer arrangement is located in the vicinity of a head ring, which is part of a front saddle mounting and connected with the exterior dished end.

3. The tank container of claim 1, wherein the outer section of the outer tank enclosure encompasses the inner cylindrical section of the inner tank enclosure only in part in a lower area.

4. The tank container of claim 1, wherein a hollow space which is defined by the spacer arrangement between the outer tank enclosure and the inner tank enclosure is filled with a test liquid or a heating/cooling medium.

5. The tank container of claim 1, wherein the clearance between the inner tank enclosure and the outer tank enclosure is equipped with a heating or cooling device.

6. Tank container with a double-walled tank comprising:
    a frame;
    an outer tank enclosure mounted to the frame and including an outer section having two ends and exterior dished ends closing off each end of the outer section;
    an inner tank enclosure, within the outer tank enclosure including an inner cylindrical section having two ends and interior dished ends closing off each end of the inner cylindrical section, wherein the outer section of the outer tank enclosure only partially encompasses the inner cylindrical section of the inner tank enclosure; and
    several spacer pieces which are placed between each exterior dished end and the corresponding interior dished end in a frusto-conical ring arrangement concentric with respect to a longitudinal tank axis of the outer section of the outer tank enclosure and each spacer piece following an exterior surface of the interior dished end and an interior surface of the exterior dished end.

7. The tank container of claim 6, wherein the spacer pieces are located in the vicinity of a head ring, which is part of a front saddle mounting and connected with the exterior dished end.

8. The tank container of claim 6, wherein the outer section of the outer tank enclosure encompasses the inner cylindrical section only in part in a lower area.

9. The tank container of claim 6, wherein a hollow space which is defined by the spacer pieces between the outer tank enclosure and the inner tank enclosure is filled with a test liquid or a heating/cooling medium.

10. The tank container of claim 6, wherein the clearance between the inner tank enclosure and the outer tank enclosure is equipped with a heating or cooling device.

* * * * *

UNITED STATES PATENT AND TRADEMARK OFFICE
CERTIFICATE OF CORRECTION

PATENT NO.       : 8,381,937 B2
APPLICATION NO.  : 11/254204
DATED            : February 26, 2013
INVENTOR(S)      : Thomas Schmidt, Dieter Pfau and Till Gerhard Page 1 of 1

It is certified that error appears in the above-identified patent and that said Letters Patent is hereby corrected as shown below:

In the Specifications

Column 1, lines 24-25, read "...in both the inner as the outer tank."; should be "...in both the inner tank as well as the outer tank."

Column 1, line 43, reads "...the front ring (12")..."; should be "...the front ring (12')...."

Column 1, lines 58-59, read "...the head ring..."; should be "...the front ring...."

Column 4, line 27, reads "...the tank axle..."; should be "...the tank axis...."

In the Claims

Column 5, Claim 1, line 41, reads "...the corresponding interior..."; should be "...a corresponding interior...."

Column 6, Claim 5, line 12, reads "...wherein the clearance..."; should be "wherein a clearance...."

Signed and Sealed this
Twenty-eighth Day of May, 2013

Teresa Stanek Rea
*Acting Director of the United States Patent and Trademark Office*